(12) United States Patent
Henriksson

(10) Patent No.: US 6,940,932 B2
(45) Date of Patent: Sep. 6, 2005

(54) DIVERSITY RECEIVER

(75) Inventor: Jukka Henriksson, Espoo (FI)

(73) Assignee: Nokia Oy, Espoo (FI)

(*) Notice: Subject to any disclaimer, the term of this patent is extended or adjusted under 35 U.S.C. 154(b) by 723 days.

(21) Appl. No.: 09/893,546

(22) Filed: Jun. 29, 2001

(65) Prior Publication Data

US 2002/0021773 A1 Feb. 21, 2002

(30) Foreign Application Priority Data

Jun. 30, 2000 (GB) .............................. 0016239

(51) Int. Cl.⁷ .............................................. H04L 1/02
(52) U.S. Cl. ........................................ 375/347; 455/273
(58) Field of Search ............................... 375/267, 299, 375/347; 370/491, 500; 455/273, 275

(56) References Cited

U.S. PATENT DOCUMENTS

| | | | |
|---|---|---|---|
| 6,128,355 A | * 10/2000 | Backman et al. | 375/347 |
| 6,141,393 A | * 10/2000 | Thomas et al. | 375/347 |
| 6,151,372 A | * 11/2000 | Yamamoto | 375/347 |
| 6,512,738 B1 | * 1/2003 | Namekata et al. | 370/210 |
| 6,654,429 B1 | * 11/2003 | Li | 375/316 |
| 2003/0007582 A1 | * 1/2003 | Ghazi-Moghadam et al. | 375/ |

FOREIGN PATENT DOCUMENTS

| | | |
|---|---|---|
| EP | 1028556 A2 | 8/2000 |
| GB | 2307830 A | 6/1997 |
| GB | 2307831 A | 6/1997 |
| WO | 97/08841 | 3/1997 |

* cited by examiner

*Primary Examiner*—Amanda T. Le
(74) *Attorney, Agent, or Firm*—Antonelli, Terry, Stout & Kraus, LLP

(57) ABSTRACT

The present invention relates to receivers, and, more particularly, to improved diversity receivers.

In some environments, such as those subject to multipath reflection or shadowing, some carriers may be received with low power. In these cases, diversity receivers may provide an improvement of around 3 dB to 6 dB, the latter figure referring to cases where the communication channel is under severe multipath fading and in mobile reception. A diversity receiver effectively comprises two or more separate receivers, or diversity branches, each with its own antenna. Each set of received carriers from each diversity branch is then combined.

The present invention provides an improved method and apparatus for receiving multi-carrier signals.

37 Claims, 2 Drawing Sheets

DIVERSITY RECEIVER

BACKGROUND

The present invention relates to receivers, and, more particularly, to improved diversity receivers.

Orthogonal frequency division multiplex (OFDM) transmission and reception is an established technique that is used in many types of broadcast systems. OFDM has been adopted as the modulation method in a number of systems for terrestrial digital video broadcasting (DVB-T). The DVB-T specification (ETSI EN 300 744) provides further details of the transmission properties and is incorporated herein by reference.

OFDM is a way in which information is transmitted over a large number of separate frequency carriers. The information to be transmitted is split up, and a portion of the information is sent on each carrier. An OFDM receiver receives the portions of information from each of the carriers and recombines them to reproduce the original signal. OFDM signals have properties which make them very resilient, particularly in poor channel environments. However, improvements are still sought which can further improve OFDM reception and transmission. This is particularly useful for mobile and portable receivers.

In some environments, such as those subject to multipath reflection or shadowing, some carriers may be received with low power. In these cases, diversity receivers may provide an improvement of around 3 dB to 6 dB, the latter figure referring to cases where the communication channel is under severe multipath fading and in mobile reception. A diversity receiver effectively comprises two or more separate receivers, or diversity branches, each with its own antenna. Each set of received carriers from each diversity branch is then combined using one of three common combining methods; maximal ratio combining (MRC), carrier selection (CS), or equal gain combining (EGC), in an attempt to produce a more robust set of carriers from which demodulation can take place.

Pure maximal ratio combining would be ideal if the noise level is the same in both diversity branches, or if it can be reliably determined. In addition, precise knowledge of the channel levels at each carrier is needed. In mobile terminals, the signal distortion is not only additive noise, but also from Doppler effects. A problem also exists in that estimating the power of low level carriers is less precise than for higher power carriers. Errors in power estimation degrades the performance of pure maximal ratio combining. Doppler effects are also more dominant with low power carriers.

BRIEF SUMMARY

According to a first aspect, there is provided a receiver for receiving multi-carrier signal conveying data and reference signals and having first and second diversity branches each diversity branch being operable to extract the data and reference signals from the multi-carrier signal, thereby producing first and second sets of extracted data and reference signals, comprising: a processor adapted to determine an estimation of the reliability of an extracted reference signal from each set of extracted reference signals; a combiner adapted to combine a data signal from the first and second set of extracted data signals in accordance with the determined estimation.

According to a second aspect, there is provided a method of receiving a multi-carrier signal conveying data and reference signals at a receiver having first and second diversity branches each diversity branch being operable to extract the data and reference signals from the multi-carrier signal, thereby producing first and second sets of extracted data and reference signals, comprising: determining an estimation of the reliability of an extracted reference signal from each set of extracted reference signals; combing a data signal from the first and second set of extracted data signals in accordance with the determined estimation.

This application describes an improved way in which data signals from diversity branches may be combined. By filtering the extracted reference values, the effects of any erroneous reference values is reduced significantly. Additionally, combination of data signals is performed in a number of different ways depending on the estimated reliability of each carrier. In this way, erroneous or disturbed carriers do not unduly affect an unaffected carrier. Such a system is particularly advantageous to mobile receivers where degradations caused by Doppler effects are common. The diversity receiver described in this application provides improved performance compared to diversity receivers of the prior art.

BRIEF DESCRIPTION OF THE DRAWINGS

The invention will now be described, by way of example only, with reference to the accompanying diagrams, in which.

DETAILED DESCRIPTION

Figure 1:
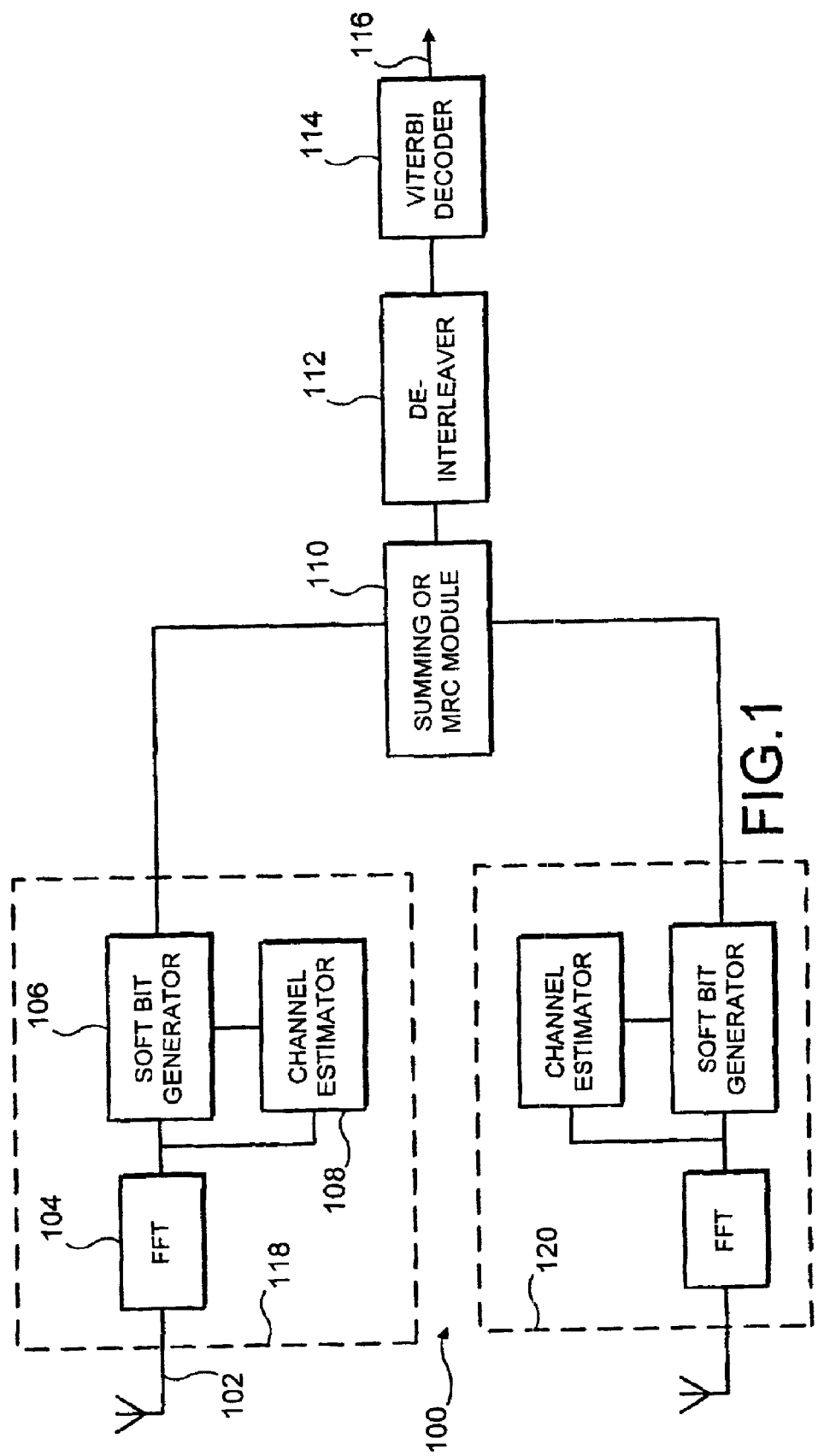
FIG. 1 is a block diagram showing an example of a diversity receiver according to the prior art.

FIG. 1 is a block diagram showing an example of diversity receiver 100 according to the prior art. The diversity receiver 100 comprises two diversity branches 118 and 120, which, in effect, are two separate OFDM receivers. Since the branches 118 and 120 are functionally equivalent, only the branch 118 will be described below.

An OFDM signal 102, comprising pilot and data values is received by a fast Fourier transform (FFT) module 104, which de-maps the received pilot and data values to produce extracted pilot (or reference) and data values. A channel estimator 108 provides information regarding the amplitude and phase of the channel transfer function at each carrier location. The channel estimator may either provide this information solely for the location of the reference carriers, or may interpolate the results to provide the information for every carrier position.

A soft bit generator 106 generates soft bit data values from the extracted symbol data. Typically, a four-bit soft data value is generated for each extracted data value. The channel estimation provided by channel estimator 108 is fed to the soft bit generator 106 to correct for any channel distortion. This enables the soft bit generator 106 to provide more accurate soft data values.

The channel corrected soft data values are input, together with the soft data values generated by the diversity branch 120, to a summing or maximal ratio combining (MRC) module 110. The MRC module combines each of the soft data values from each of the diversity branches 118 and 120, in order to provide improved accuracy.

The combined data values are then de-interleaved by a de-interleaver 112 before being demodulated in a Viterbi decoder 114 to produce an output signal 116.

Figure 2:
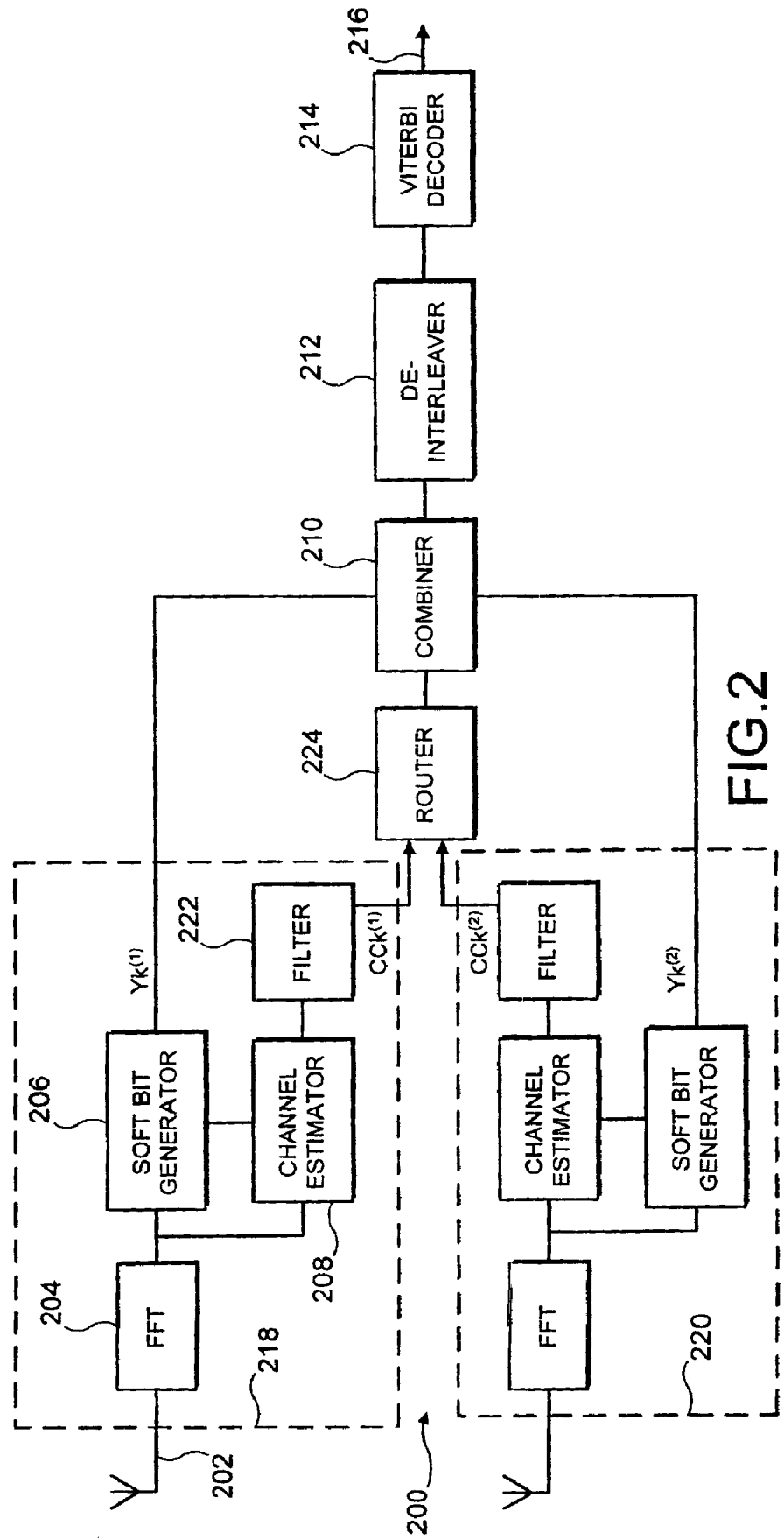
FIG. 2 is a block diagram of a diversity receiver according to a first embodiment of the invention.

FIG. 2 is a block diagram of a diversity receiver 200 according to a first example embodiment of the invention. The diversity receiver 200 comprises two diversity branches 218 and 220. Since both of these diversity branches are equivalent, only the branch 218 will be described below. An OFDM signal 202, comprising pilot and data values is received by a fast Fourier transform (FFT) module 204, which de-maps the received pilot and data values to produce extracted pilot (or reference) and data values. A channel estimator 208 uses the extracted pilot values to provide an estimation of the channel distortion. A soft bit generator 206 generates soft bit data values from the extracted symbol data. Typically a four-bit soft data value is generated for each extracted data value. The channel estimation provided by a channel estimator 208 is fed to the soft bit generator 206 to correct for any channel distortion. This enables the soft bit generator 206 to provide more accurate soft data values.

The channel estimator corrects the received reference values for any channel distortion and produces, by a process of interpolation, a reference value corresponding to each data value. Each interpolated reference value gives an indication of the channel characteristics of the corresponding data value.

The channel corrected reference values are output from the channel estimator 208 and are filtered by a filter 222. The filtered reference values are fed to a router 224 which decides whether to route one or both of the carrier values through to a combiner 210. The filter 222 and the router 224 are described in further detail below.

The combiner 210 combines the soft data values from both diversity branches 218 and 220 according to the carrier values received from the router 224.

The combined data values are then de-interleaved by a de-interleaver 212 before being demodulated in a Viterbi decoder 214 to produce an output signal 216. In an alternative embodiment, the soft bit generator 206 may be positioned after the combiner 210.

The filter 222 reduces the effects of occasional errors in channel estimates caused by distorted or corrupt pilot values by 'averaging' the value of each reference value over a number of reference values. Such occasional errors occur in many situations, especially with channel transfer functions having frequent up and down variations, for example channels subject to relatively long multipath delay differences. The filter effectively operates as a 'sliding window' over the reference values, smoothing out any occasional erroneous reference values.

In the filter 222, a credibility level $cc_k$ is calculated for each carrier k having an amplitude $c_k$. Preferably, the credibility level is calculated as follows:

$$cc_k = \text{Median}(c_{k-m}, c_{k-m+1}, \ldots, c_k, \ldots, c_{k+m}) \quad \text{Equation (1)}$$

where $c_{k-1}$ and $c_{k+1}$ are the neighboring carriers. These are complex values containing both amplitude and phase information. Additionally, a number m of carriers above and below the present carrier are also taken. Preferably m is a small number between one and seven and is preferably an odd number to simplify the process of finding the median value. Alternatively, an even number could be used, although this slightly increases the complexity of the filter. The effect of the filtering is to smooth out any anomalous values.

The filtered reference values are fed to the router 224, together with the corresponding filtered reference values from the other diversity branch 220.

The router 224 compares the credibility level for corresponding reference values from each of the diversity branches. Depending on the results of the comparison, the data values corresponding to each reference value from each diversity branch are combined in the combiner 210 in one of a number of ways.

If the credibility level difference is above a given threshold T it is likely that that the branch with lower credibility level has been corrupted for example, due to Doppler shift during transmission. In this case, only the better of the two branches is routed to the combiner 210 and the combiner 210 just selects the signal with higher credibility level. The combiner 210 may also apply an additional weighting to the selected signal.

If the difference in credibility levels is below the threshold T it is likely that none of the current received reference values in either branch were significantly affected by interference during transmission. In this case, the signals from each diversity branch are routed to the combiner 210 and are combined using a weighted average.

One way in which the weighted average may be calculated is as follows:

$$\text{Average} = \frac{c_k^{(1)} y_k^{(1)} + c_k^{(2)} y_k^{(2)}}{2} \quad \text{Equation (2)}$$

where $c_k^{(n)}$ is a reference value and $y_k^{(n)}$ is the soft bit data value, for a carrier k from a diversity branch n.

An alternative approach is to use just equal gain combining (EGC), for example using a weighting of 1 or 0.5 for both branches.

Therefore, where the difference in credibility level for a given carrier is small, then maximal ratio combining (MRC) or EGC of carriers from each diversity branch is performed in the combiner 210. If the difference in credibility level is high, carrier selection is made and the combiner selects the strongest signal, which may additionally have weighting applied.

Alternatively, the filter 222 may calculate the mean value of a number of reference values. Furthermore, the number m of reference values used in the filter 222 for calculating the credibility factor may be varied dynamically in dependence on the characteristics of the channel conditions. Such characteristics can be obtained by the channel estimator 208. For example, in disturbed transmission channels, the number m of reference values used can be increased to spread the effect of any distorted reference values over a wide range. Alternatively, in a very clean channel, the number m of reference values can be reduced.

Those skilled in the art will also appreciate that other filtering operations could be performed by the filter 222, including both linear and non-linear filtering operations. The filter 222 could be implemented, for example, using a microprocessor, digital signal processor or other suitable processing means. Those skilled in the art will also appreciate that other weighting and combining schemes could be used, without detracting from the inventive concepts described herein. It will also be appreciated that, although the example embodiment of the invention is described with reference to OFDM and DVB-T technologies, it could equally be applied to any discrete multi-tone or multi-carrier signals. Additionally, further diversity branches could be added and the results from each branch combined and filtered in accordance with the present invention as described above.

What is claimed is:

1. A receiver for receiving a multi-carrier signal conveying data and reference signals having a first and a second diversity branch each operable to extract the data and reference signals from the multi-carrier signal, thereby producing a first and second set of extracted data and reference signals, comprising:
- a processor for determining an estimation of the reliability of an extracted reference signal from each set of extracted reference signals;
- a combiner for combining a data signal from the first and second set of extracted data signals in accordance with the determined estimation; and wherein
- the processor determines the estimation of the reliability of each set of extracted reference signals by a process of calculation and calculates the estimation using adjacent reference signals from each set of extracted reference signals.

2. A receiver according to claim 1, wherein the number of adjacent reference signals used in the calculation is between 1 and 7.

3. A receiver according to claim 1, wherein the process of calculation determines the median of a set of extracted reference signals.

4. A receiver according to claim 1, wherein the process of calculation determines the mean of a set of extracted reference signals.

5. A receiver according to claim 1, wherein the combiner applies a weighting to each extracted data signal prior to combining.

6. A receiver according to claim 1, wherein the combiner combines the first and second set of extracted data signals in a first manner when the difference between the determined reliability of each set of reference signals is above a predetermined threshold, and combines the first and second set of extracted data signals in a second manner when the determined reliability difference of each set of reference signals is below the predetermined threshold.

7. A receiver according to claim 6, wherein the first manner of combining is a maximal ratio combining (MRC).

8. A receiver according to claim 6, wherein the first manner of combining is an equal gain combining (EGC).

9. A receiver according to claim 6, wherein the second manner of combining is by signal selection.

10. A receiver according to claim 1, wherein the processor is a filter.

11. A receiver according to claim 1, further comprising at least a third diversity branch.

12. A receiver according claim 1, wherein the receiver is adapted to receive orthogonal frequency division multiplex (OFDM) signals.

13. A method of receiving a multi-carrier signal conveying data and reference signals at a receiver having a first and a second diversity branch each operable to extract the data and reference signals from the multi-carrier signal, thereby producing a first and second set of extracted data and reference signals, comprising:
- determining an estimation of the reliability of an extracted reference signal from each set of extracted reference signals; and
- combining a data signal from the first and second set of extracted data signals in accordance with the determined estimation; and wherein
- the step of determining an estimation comprises determining the estimation by a process of calculation and calculates the estimation using adjacent reference signals from each set of extracted reference signals.

14. A method according to claim 13, wherein the step of determining comprises calculating the estimation using between 1 and 7 adjacent reference signals.

15. A method according to claim 13, wherein the step of determining comprises determining the median of the reference signals.

16. A method according to claim 13, wherein the step of determining comprises determining the mean of the reference signals.

17. A method according to claim 13, further comprising applying a weighting to each extracted data signal prior to combining.

18. A method according to claim 13, wherein the step of combining combines the first and second set of extracted data signals in a first manner when the difference between the determined reliability of each set of reference signals is above a predetermined threshold, and combines the first and second set of extracted data signals in a second manner when the determined reliability difference of each set of reference signals is below the predetermined threshold.

19. A method according to claim 18, wherein the first manner of combining performs a maximal ratio combining (MRC).

20. A method according to claim 18, wherein the first manner of combining performs an equal gain combining (EGC).

21. A method according to claim 18, wherein the second manner of combining performs a signal selection.

22. A method according to claim 13, wherein the step of determining further comprises filtering the extracted reference signals.

23. A method according to claim 13, for receiving orthogonal frequency division multiplex (OFDM) signals.

24. A receiver for receiving a multi-carrier signal conveying data and reference signals having a first and a second diversity branch each operable to extract the data and reference signals from the multi-carrier signal, thereby producing a first and second set of extracted data and reference signals, comprising:
- a processor for determining an estimation of the reliability of an extracted reference signal from each set of extracted reference signals;
- a combiner for combining a data signal from the first and second set of extracted data signals in accordance with the determined estimation; and wherein
- the processor determines the estimation of the reliability of each set of extracted reference signals by a process of calculation; and
- the process of calculation determines the median of the reference signals.

25. A receiver for receiving a multi-carrier signal conveying data and reference signals having a first and a second diversity branch each operable to extract the data and reference signals from the multi-carrier signal, thereby producing a first and second set of extracted data and reference signals, comprising:
- a processor for determining an estimation of the reliability of an extracted reference signal from each set of extracted reference signals;
- a combiner for combining a data signal from the first and second set of extracted data signals in accordance with the determined estimation; and wherein
- the processor determines the estimation of the reliability of each set of extracted reference signals by a process of calculation; and
- the process of calculation determines the mean of the reference signals.

26. A receiver for receiving a multi-carrier signal conveying data and reference signals having a first and a second diversity branch each operable to extract the data and reference signals from the multi-carrier signal, thereby producing a first and second set of extracted data and reference signals, comprising:

a processor for determining an estimation of the reliability of an extracted reference signal from each set of extracted reference signals; and a combiner for combining a data signal from the first and second set of extracted data signals in accordance with the determined estimation; and wherein the combiner combines the first and second set of extracted data signals in a first manner when the difference between the determined reliability of each set of reference signals is above a predetermined threshold, and for combining the first and second set of extracted data signals in a second manner when the determined reliability difference of each set of reference signals is below the predetermined threshold.

27. A receiver according to claim 26, wherein:

the first manner of combining is a maximal ratio combining (MRC).

28. A receiver according to claim 26, wherein:

the first manner of combining is an equal gain combining (EGC).

29. A receiver according to claim 26, wherein:

the second manner of combining is by signal selection.

30. A method of receiving a multi-carrier signal conveying data and reference signals at a receiver having a first and a second diversity branch each operable to extract the data and reference signals from the multi-carrier signal, thereby producing a first and second set of extracted data and reference signals, comprising:

determining an estimation of the reliability of an extracted reference signal from each set of extracted reference signals; and combining a data signal from the first and second set of extracted data signals in accordance with the determined estimation; and wherein the step of determining an estimation comprises determining the estimation by a process of calculation, using adjacent reference signals from each set of between 1 and 7 adjacent extracted reference signals, and determining the median of the reference signals.

31. A method of receiving a multi-carrier signal conveying data and reference signals at a receiver having a first and a second diversity branch each operable to extract the data and reference signals from the multi-carrier signal, thereby producing a first and second set of extracted data and reference signals, comprising:

determining an estimation of the reliability of an extracted reference signal from each set of extracted reference signals; and combining a data signal from the first and second set of extracted data signals in accordance with the determined estimation; and wherein the step of determining an estimation comprises determining the estimation by a process of calculation, using adjacent reference signals from each set of between 1 and 7 adjacent extracted reference signals, and determining the median of the reference signals.

32. A method of receiving a multi-carrier signal conveying data and reference signals at a receiver having a first and a second diversity branch each operable to extract the data and reference signals from the multi-carrier signal, thereby producing a first and second set of extracted data and reference signals, comprising:

determining an estimation of the reliability of an extracted reference signal from each set of extracted reference signals; and combining a data signal from the first and second set of extracted data signals in accordance with the determined estimation; and wherein the step of combining combines the first and second set of extracted data signals in a first manner when the difference between the determined reliability of each set of reference signals is above a predetermined threshold, and combines the first and second set of extracted data signals in a second manner when the determined reliability difference of each set of reference signals is below the predetermined threshold.

33. A method according to claim 32, wherein:

the first manner of combining performs a maximal ratio combining (MRC).

34. A method according to claim 32, wherein:

the first manner of combining performs an equal gain combining (EGC).

35. A method according to claim 32, wherein:

the second manner of combining performs a signal selection.

36. A method according to claim 32, wherein:

the step of determining further comprises filtering the extracted reference signals.

37. A method according to claim 32, comprising:

receiving orthogonal frequency division multiplex (OFDM) signals.

* * * * *